Sept. 6, 1932.    J. R. REYBURN    1,876,345
REPAIR LINK FOR CROSS CHAINS
Filed June 23, 1928
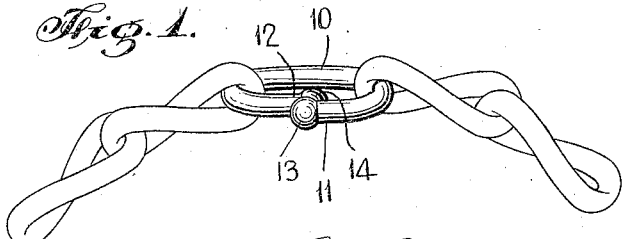
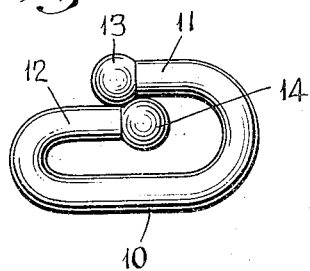
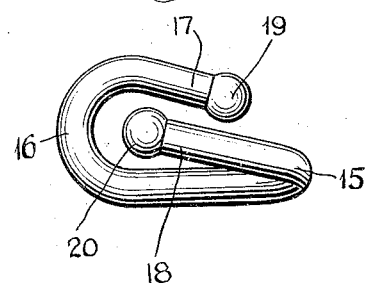
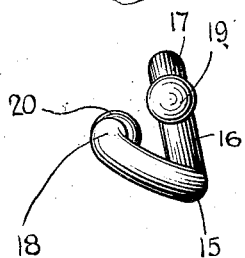
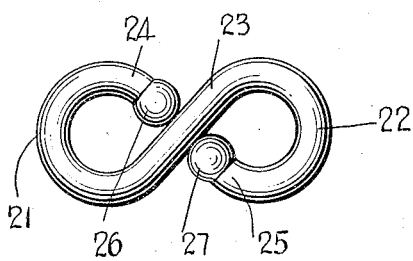
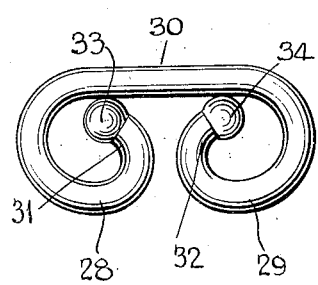
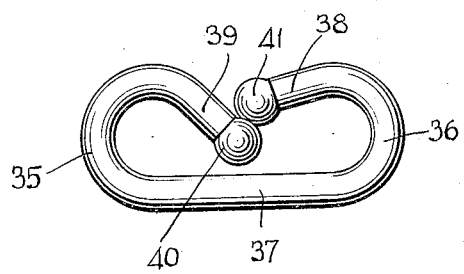
INVENTOR
John R. Reyburn
BY
ATTORNEY Patented Sept. 6, 1932

1,876,345

UNITED STATES PATENT OFFICE

JOHN R. REYBURN, OF FAIRFIELD, CONNECTICUT, ASSIGNOR TO AMERICAN CHAIN COMPANY, INC., A CORPORATION OF NEW YORK

REPAIR LINK FOR CROSS CHAINS

Application filed June 23, 1928. Serial No. 287,663.

The present invention relates to tire chains and has for an object to provide an improved repair link adapted particularly for repairing the cross chains of a tire chain.

Tire chains are usually formed with a pair of side members connected at intervals by cross chains which are adapted to run transversely across the thread of a tire. Obviously, the links of the cross chain are subjected to considerable wear particularly at or near the middle of the cross chain and are liable to be worn through or to break in time. Usually, this break occurs while the car is on the road, and the loose ends of the cross chain at each side of the break fly out centrifugally as the wheel rotates, striking the fender of the car and making a distressing noise. It is therefore desirable to repair the break at once, not only because of its annoyance but also because if neglected and other cross chains give way, the tire chain may drop off the wheel and be lost.

An object of the present invention is to provide a repair link which may be applied instantly, by any one, without waiting to reach a garage.

Repair links should be made of substantially the same sized stock as that of the cross chain links, so that they will withstand the heavy wear to which the cross chain is subjected. Because the link stock cannot be bent readily with ordinary hand pliers, it is customary to form the repair link with open loops, the free ends of which project in such direction that on starting the car, the ends will be bent by the weight of the vehicle, as they roll into contact with the ground, and the loops of the link will thus be closed.

One of the objections to such repair links, as heretofore constructed, lies in the danger of tearing or puncturing the tire with the free ends of the link, and it is an object of the present invention to provide repair links of such form as to prevent the free ends thereof from doing damage to a vehicle tire. This is of particular importance with that type of link in which one end is twisted with respect to the other in the manner of a curb link, for in such types one of the free ends of the repair link must necessarily press against the tire while it is being bent to close the link. There is less danger of damage to the tire in the case of links so formed that when applied, the projecting end or ends are directed away from the tire, but even with such links there is danger of injury to the tire from the relatively sharp edges of the link ends.

By my invention, each free end portion of the link terminates in a ball or knob, so that there will be no danger of forcing the link ends into the tire while they are being bent, nor will the tire be torn by the link ends as the chain creeps on the wheel in service.

In the accompanying drawing, I have illustrated a number of different forms of links, each provided with balled ends, in order to illustrate the adaptability of my invention.

In the drawing,

Fig. 1 is a perspective view showing an ordinary closed loop repair link applied to a cross chain;

Fig. 2 is a plan view of the repair link shown in Fig. 1;

Fig. 3 is a view of a twisted repair link;

Fig. 4 is an end view of the same;

Fig. 5 is a plan view of an S-shaped link;

Fig. 6 is a view of a spectacle-shaped link; and

Fig. 7 is a view of a substantially C-shaped link.

All of these links, it will be observed, are provided with balled ends. Thus, in the plain link 10, shown in Figs. 1 and 2, the link is flat after it has been compressed with one free end portion 11 overlapping the other free end portion 12. The end portions 11 and 12 are each formed with ball ends, as indicated at 13 and 14 respectively. Before application to the tire, the end portion 12 is bent out of the plane of the link sufficiently to permit of passing it through the cross chain links and after pressure has been applied upon the link to close the same, the ball 14 will fit snugly against the ball 13 and thus close the link.

The type of link shown in Fig. 3 is one in which one loop portion 15 is disposed at substantially right angles to a loop portion 16 and the free portions 17 and 18 of the link are so disposed that when the link is compressed, the end 18 will be bent into the loop 16 and the end 17 into the loop 15. The loop end portions 17 and 18 are also formed with knobs or ball terminals 19 and 20, respectively.

The form of link shown in Fig. 5 takes the shape of the letter S and consists of two loop portions 21 and 22 with one side of the loop 22 connected to the opposite side of the loop 21 by means of a stem 23. The free ends 24 and 25 of the loops 21 and 22 respectively are formed with knobs 26 and 27. Normally, the ends 25 and 24 are bent upward so that there will be sufficient clearance beween the knobs and the stem 23 to permit of passing these loop ends through the links of the cross chain. When the repair link is subjected to pressure by the vehicle, the ends 24 and 25 will be forced into the plane of the link and the knobs 26 and 27 will contact with or closely approximate the stem 23. The form of link shown in Fig. 6 takes the shape of a pair of spectacles and consists of two opposed spiral portions 28 and 29 connected by a bridge member 30, thus forming two eyes 31 and 32 in which the links of the cross chain will be confined. The spiral portions 28 and 29 terminate in knobs 33 and 34 respectively, and normally the spiral portions have such a pitch as to provide sufficient clearance between the knobs and the bridge member 30 to permit of threading the spirals through the cross chain links. When the link is subjected to pressure by the vehicle, the spiral portions will be flattened out into the plane of the link and the knobs 33 and 34 will bear against or closely approximate the bridge member 30.

The type of link shown in Fig. 7 is somewhat similar to that shown in Figs. 1 and 2 except that the end portions are bent inward providing two loop portions 35 and 36 which are of approximately equal diameter. These loop portions are connected by a stem 37. The loop ends 38 and 39 terminate in knobs 40 and 41. This link, before being applied to a chain, consists of a flat link with the end 39 inclined out of the plane of the link, the inclination being such as to provide sufficient clearance between the knobs 40 and 41 and between the knob 40 and the stem 37 to permit of the passage of a chain link therebetween. When this repair link is compressed, the member 39 is bent downward into the plane of the loops with the knob 40 contacting with the knob 41 and also coming so close to the stem 37 as to prevent a chain link from slipping out of one loop 35 and into the other loop 36.

It will be observed that in all of these forms of links, the link ends are rounded or formed with knobs. Obviously, there may be other forms of links to which this link and terminal might be applied, and I do not limit my invention to the particular forms here shown, nor do I limit my invention to the particular form of knob here shown, but consider myself entitled to any link end so rounded as to prevent the possibility of damage to a vehicle tire.

Having thus described my invention, what I claim and desire to secure by Letters Patent is:

A repair link consisting of a rod formed with knob like ends, the rod being of uniform cross section between said ends, the rod also being bent to form an open loop with the free ends of the rod lying in different planes, and adapted in service to be bent transversely into a common plane.

In testimony whereof, I have signed this specification.

JOHN R. REYBURN.